(12) United States Patent
Hehl

(10) Patent No.: US 7,040,887 B2
(45) Date of Patent: May 9, 2006

(54) CLOSABLE NOZZLE BODY

(76) Inventor: Karl Hehl, Arthur-Hehl-Strasse, K-72290, Lossburg (DE)

( * ) Notice: Subject to any disclaimer, the term of this patent is extended or adjusted under 35 U.S.C. 154(b) by 242 days.

(21) Appl. No.: 10/471,503

(22) PCT Filed: Mar. 16, 2002

(86) PCT No.: PCT/EP02/02945

§ 371 (c)(1),
(2), (4) Date: Sep. 11, 2003

(87) PCT Pub. No.: WO02/074517

PCT Pub. Date: Sep. 26, 2002

(65) Prior Publication Data

US 2004/0076709 A1    Apr. 22, 2004

(30) Foreign Application Priority Data

Mar. 20, 2001 (DE) ................. 101 13 352

(51) Int. Cl.
*B29C 45/23* (2006.01)

(52) U.S. Cl. .............. 425/562; 264/328.9; 264/328.13; 264/328.19; 425/564; 425/566

(58) Field of Classification Search ................ 425/562, 425/563, 564, 565, 566; 264/328.1, 328.9, 264/328.13, 328.19
See application file for complete search history.

(56) References Cited

U.S. PATENT DOCUMENTS

| 3,295,169 A | * | 1/1967 | Moslo | 425/563 |
| 4,368,847 A | * | 1/1983 | Ersfeld | 425/566 |
| 4,886,439 A | | 12/1989 | Hehl | |

FOREIGN PATENT DOCUMENTS

| DE | 1554 934 | 1/1970 |
| DE | 1729 391 | 10/1971 |
| EP | 0322497 | 2/1988 |
| GB | 976369 | 11/1964 |
| JP | 55067434 | 5/1980 |
| JP | 02169219 | 6/1990 |

* cited by examiner

*Primary Examiner*—Tim Heitbrink
(74) *Attorney, Agent, or Firm*—Cantor Colburn LLP

(57) ABSTRACT

A closing element, which has an open position and a closed position and is actuated by an actuating element, is arranged in the nozzle channel of a nozzle body. In the closing position, the closing element separates a region that is at least temporarily in open communication with the injection mold, the region being able to be influenced by a second actuating element associated with the nozzle body. Due to the fact that the pressure element is arranged in the nozzle body and can be actuated independently from the nozzle body and the plastifying cylinder, a nozzle body is created and a method is provided that enable the dosing process and dwell pressure process to be separated with a compact structure.

19 Claims, 4 Drawing Sheets

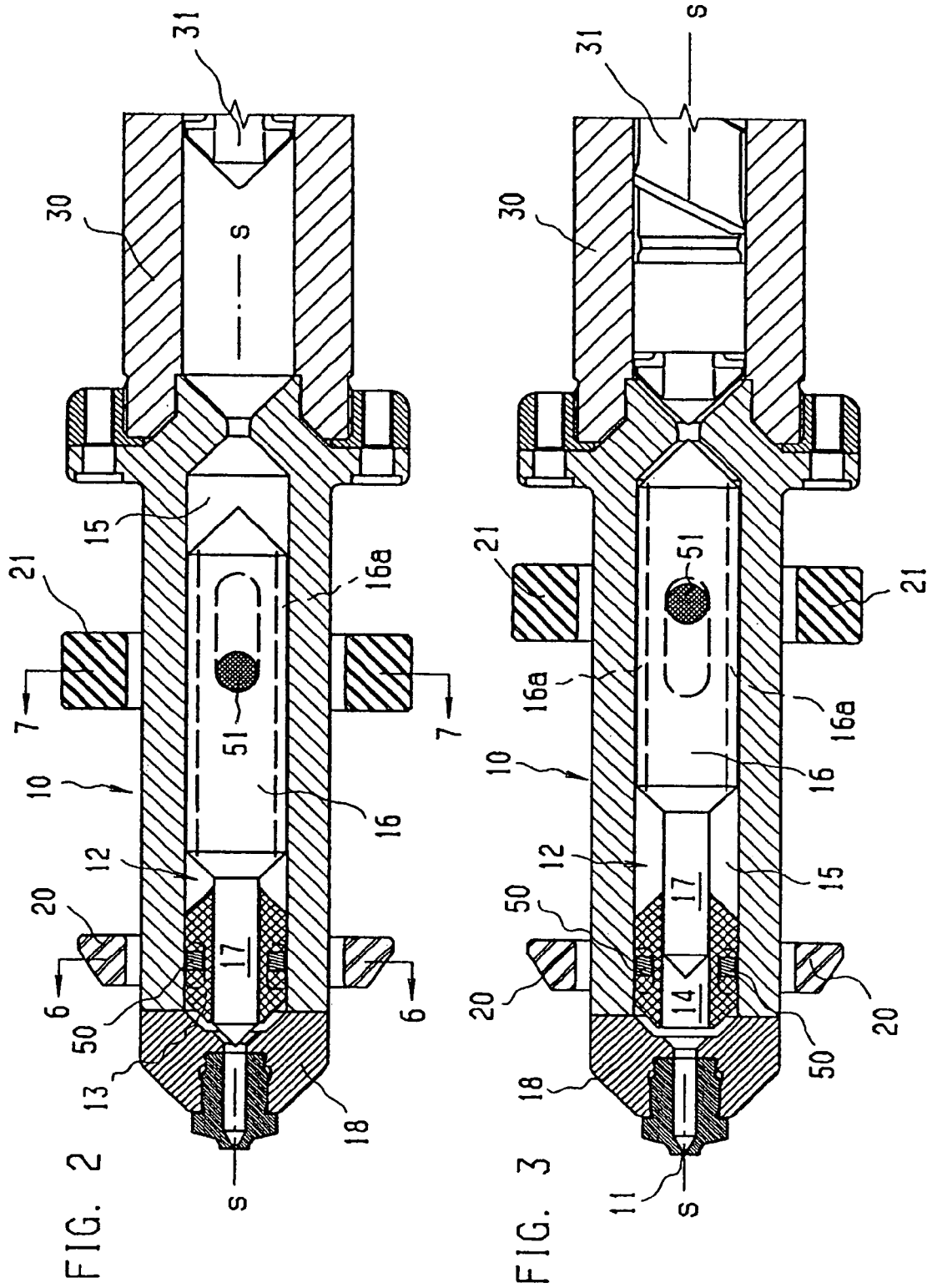

CLOSABLE NOZZLE BODY

REFERENCE TO RELATED APPLICATIONS

The present application claims the priority of the German patent application 101 13 352.9, lodged on Mar.20, 2002, the disclosure content of which is herewith also made expressly the subject of the present application.

BACKGROUND SECTION

A nozzle body for an injection molding machine for processing plastic materials and other plastifiable materials, such as pulverulent or ceramic materials, is known from DE 15 54 934 A, wherein a piston shaft is moved hydraulically, which from a starting position first drives into the bore of a mouth ring and hence closes the nozzle opening and then serves for generating the holding pressure. Insofar this piston shaft is at the same time closure element and pressure element. Therein a change in volume already occurs when the piston shaft is transferred into closure position.

From PATENT ABSTRACTS OF JAPAN, vol. 014, no. 428 (M-1025), 14. September 1990 & JP 02 169219 A a nozzle body is known comprising a cyclically usable closure and pressure element that is axially movable in the nozzle body to influence the holding pressure which significantly influences the quality of the moldings. In actuating the pressure element, however, a change in volume occurs, what is influencing the process control and hence at least also the cycle by cycle reproducible quality of the moldings.

A nozzle body having a closure element which can be used cyclically, is also known from GB 976,369 PS. The plastified material is injected alternately into two mould cavities, the closure element releasing the runner to the one mould cavity when it closes the other. One pressure cylinder unit respectively is associated with the runners so that, as soon as the closure element closes the one runner, the pressure cylinder unit on the associated mould cavity can influence the holding pressure, whilst material is already injected again into the other mould cavity. The time advantage obtained therewith is based however on the fact that two mould cavities are operated alternately so that this device cannot be applied to a compact nozzle unit which possibly operates only one mould cavity.

It is known furthermore to use a shut-off nozzle on a plastic material injection molding machine depending on the material, said shut-off nozzle opening and closing the nozzle opening cyclically. Closure nozzles of this type are known for example from EP 0 322 497 A2. Closure is effected only at the end of the holding pressure phase which is required for obtaining a qualitatively high-grade molded article without sinks or shrinkholes. However, precisely in the case of thick-walled molded articles a long holding pressure time is required, which in this respect contributes directly to increasing the cycle time.

SUMMARY OF THE INVENTION

Starting from this state of the art, the object underlying the present invention is to produce a nozzle body and to make available a method which, with a compact construction, permits a separation between the dosing process and the holding pressure process.

For this purpose, a holding pressure chamber is provided in the nozzle body in addition to the closure element, said holding pressure chamber being able to be influenced by a pressure element actuated in the nozzle body by a further actuation member. It is consequently possible on the one hand to have an influence with the actuation member on this chamber and on the mould cavity which is connected thereto, in order for example to build up the holding pressure. On the other hand, dosing can already take place again at the same time however in front of the closure element, independently of the application of the holding pressure. As a result, precisely with PET preforms, which generally have a large wall thickness and hence require a long holding pressure time, this long holding pressure time can be used already once again for dosing, so that the cycle time is significantly reduced. However, only the separation in the nozzle body is essential for the invention so that, by external actuation, the holding pressure in the nozzle can be influenced, preferably can be influenced in a controlled manner, even if no use is made of this option. A separation of holding pressure and material pressure is therefore possible. The separation of dosing chamber and holding pressure chamber in the nozzle body leads however also to the fact that the material to be dosed can be dosed over a fairly long period of time and hence, if required, more slowly. Hence a smaller torque acts upon the screw, so that the material is subjected to fewer shear forces. This also ensures gentler handling with sensitive materials.

Due to the actuation of the pressure element independently of the nozzle body and plastifying cylinder, the holding pressure force is no longer dependent upon the nozzle touch force. At the same time, the impermeability of the nozzle unit is increased.

Therein the actuation member engages on a pressure element which is mounted so as to float in the nozzle channel. As a result, a compact construction is produced since the pressure element is controllable on the one hand for influencing the holding pressure chamber but can be subjected to a flow of the newly dosed material already, without the thereby resultant pressure preventing the movement of the pressure element.

BRIEF DESCRIPTION OF THE FIGURES

The invention is explained subsequently in more detail with reference to the enclosed figures, which show.

DETAILED DESCRIPTION

The invention is now explained in more detail by way of example with reference to the enclosed drawings. However, the embodiments only concern examples which are not intended to restrict the inventive concept to a specific arrangement.

Figure 1:
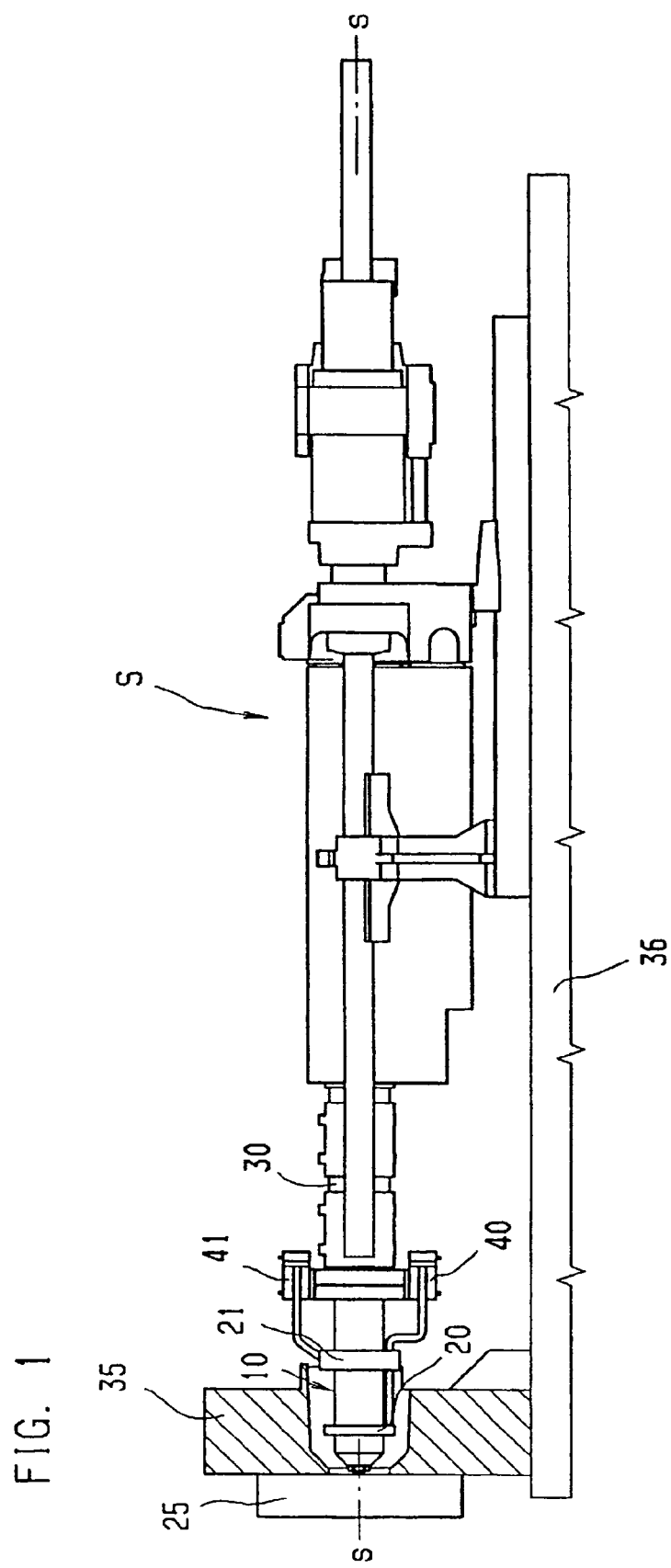
FIG. 1 a side view of an injection molding unit with a nozzle body according to the invention, disposed on a machine base, FIG. 2 an enlarged section through the nozzle body according to FIG. 1 at the beginning of the mould filling phase, FIG. 3 an illustration according to FIG. 2 near the end of the mould filling phase, FIG. 4 an illustration according to FIG. 2 at the beginning of the holding pressure phase, FIG. 5 an illustration according to FIG. 2 at the end of the holding pressure phase, FIG. 6, 7 sections through FIG. 1 along the lines 6—6 or 7—7.

FIG. 1 shows an injection molding unit S of an injection molding machine for processing plastic materials and other plastifiable materials, such as pulverulent or ceramic materials which machine is disposed on a machine base 36. The injection molding unit has a plastifying cylinder 30, on the front end of which a nozzle body 10 is disposed. Rings 20, 21 are disposed on the nozzle body as actuation elements for parts disposed in the interior of the nozzle body, said rings being actuated by actuation members 40, 41. Other elements can also be provided instead of the rings as long as only one reliable power introduction is possible into the parts disposed within the nozzle body 10. The injection molding unit S plastifies the material and injects it via the nozzle body 10 into a mould cavity of an injection mould 25. At least one part of the generally multi-part injection mould 25 is mounted on the stationary mould carrier 35, which according to FIG. 1 is penetrated by the nozzle body 10 in a passage opening.

According to FIGS. 2 to 5, the nozzle body 10 has a nozzle opening 11 for injecting the plastified material into the injection mould 25. In the nozzle opening 11, there discharges a nozzle channel 12 which is connected at the other end to a plastifying cylinder 30 in which a feeding means 31, here a feed screw, feeds the plastified material in the direction towards the nozzle opening 11.

Furthermore, a closure element 13 is provided for closure if required of the nozzle channel 12, and is actuated by an actuation member 40. The closure element 13 separates, in the closure position, a chamber which is in open communication at least at times with the injection mould 25. This chamber can be influenced by a further actuation member 41 which is associated with the nozzle body 10.

The closure element 13 hence separates, in the closure position, a chamber configured as holding pressure chamber 14 in the nozzle body 10 from a dosing chamber 15 which is connected to the feeding means 31 of the plastifying cylinder 30. As a result, the internal pressure and/or the volume of the holding pressure chamber 14 can be influenced independently of the dosing taking place on the other side of the closure element and can be controlled or regulated in the embodiment by means of a pressure element 16. The pressure element is disposed preferably coaxially to an injection axis s—s in the nozzle body 10, which axis goes through the nozzle opening 11.

Figure 7:
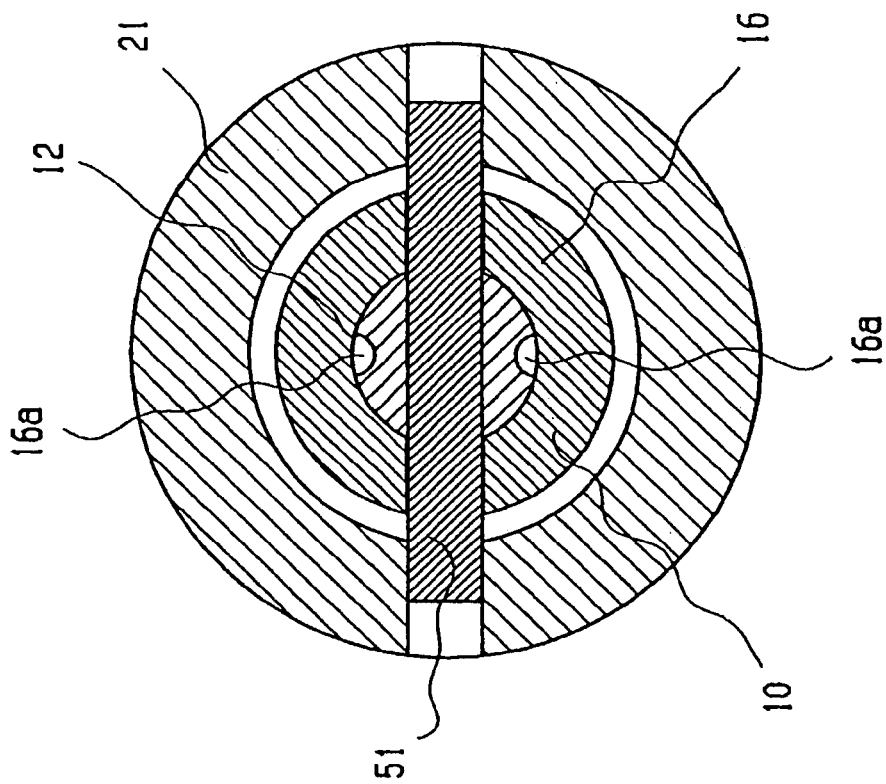

The pressure element 16 is disposed in the nozzle channel 12 in the embodiment of FIGS. 2 to 7 and is moveable there in a limited manner. FIGS. 2 and 7 show that the ring 21 actuated by the actuation member 41 is in operational connection by means of an actuation element 51 with the pressure element 16 disposed in the nozzle channel 12. The maximum movement possibility is limited by a slot. On its front end, the pressure element 16 has a piston 17 which acts upon the holding pressure chamber 14 and is guided in this embodiment in the closure element 13. The pressure element 16 is mounted so as to float in the nozzle channel 12, so that it can itself be reliably actuated when material is again already fed and dosed behind the closure element 13. As a result, a compact construction is produced since the pressure element is controllable on the one hand for influencing the holding pressure chamber, but at the same time can be subjected to a flow already from the newly dosed material, without the thereby resultant pressure preventing the movement of the pressure element.

The movement of the pressure element 16 and of the piston 17, which is securely connected thereto, leads not to a change in volume when the closure element 13 is open but only to a volume displacement since the shape of the pressure element 16 and piston 17 is configured such that, when the holding pressure chamber 14 and dosing chamber 15 are in open communication, the pressure around the pressure element is cancelled out. The open communication is ensured by the passage channels 13a and the through-flow channels 16. Because of the floating mounting in the nozzle channel, the forces in front of and behind the pressure element are hence cancelled out. The pressure ratios around the pressure element remain unchanged so that the pressure element has no influence or at least no substantial influence upon the process control. The same applies fundamentally also during actuation of the closure element 13.

Figure 6:
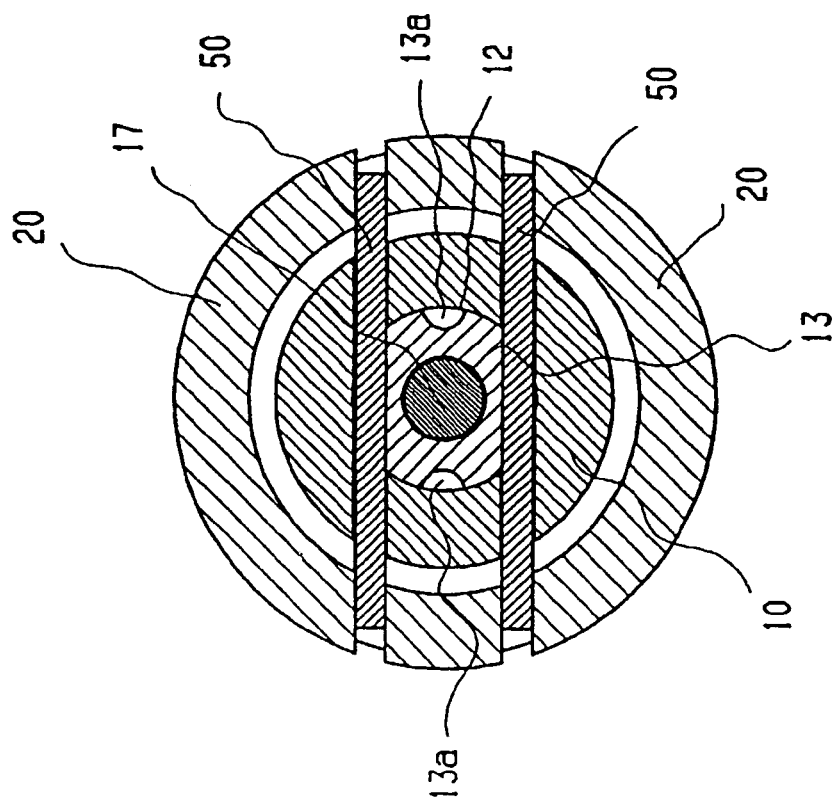

According to FIG. 7, the pressure element 16 has through-flow channels 16a for the passage of plasticised material, which channels are delimited in the embodiment by the wall of the nozzle channel 12. The through-flow channels can however also be disposed such that they come to lie entirely in the pressure element and no contact with the wall of the nozzle channel 12 occurs. As FIGS. 2 to 5 show, the closure element 13 is disposed in the flow direction of the plastified material after the pressure element 16, however its piston 17 lies parallel to the pressure element 16. The closure element 13 is likewise disposed in the nozzle channel and has passage channels 13a for the passage of plastified material into the holding pressure chamber 14. These passage channels 13a, which are present in the open position according to FIG. 6, are closed by an axial movement of the closure element 13 on the wall of the nozzle channel 12, preferably at the end-side on the nozzle head 18. Other closure possibilities are possible but this embodiment has the advantage that a relatively large sealing face is produced with a small closure path.

In this embodiment, the device operates in the following manner:

The state at the beginning of the filling phase is illustrated in FIG. 2. The feeding means 31 is still located in the withdrawn state on the right in FIG. 2. In the chamber in front of the feeding means 31, plastified and dosed material is situated. The pressure element 16 is moved further forwards at the end of the last cycle, whilst the closure element is transferred to the right into its open position. If the feeding means 31 is now moved to the left in FIG. 2, then firstly material is conveyed via the through-flow channels 16a and also the passage channels 13a into the injection mould 25.

An illustration according to FIG. 3 is produced towards the end of the filling phase. On the one hand, the pressure element 16 was thereby withdrawn or pushed to the right so that a holding pressure chamber 14 is formed in front of the piston 17 of the pressure element 16. The closure element 13 is still located in the open position. The movement of the pressure element 16 and of the piston 17, which is securely connected thereto, leads not to a change in volume when the closure element 13 is open but only to a volume displacement. Because of the floating mounting in the nozzle channel, the forces in front of and behind the pressure element are hence cancelled out. The pressure ratios around the pressure element remain unchanged so that the pressure element has no influence upon the process control.

However, the closure element 13 is also configured such that the same forces are applied in front of and behind the closure element in the open position. The movement of pressure element 16 with piston 17 and also the movement of the closure element therefore have above all no influence upon the injection molded part.

Figure 4:
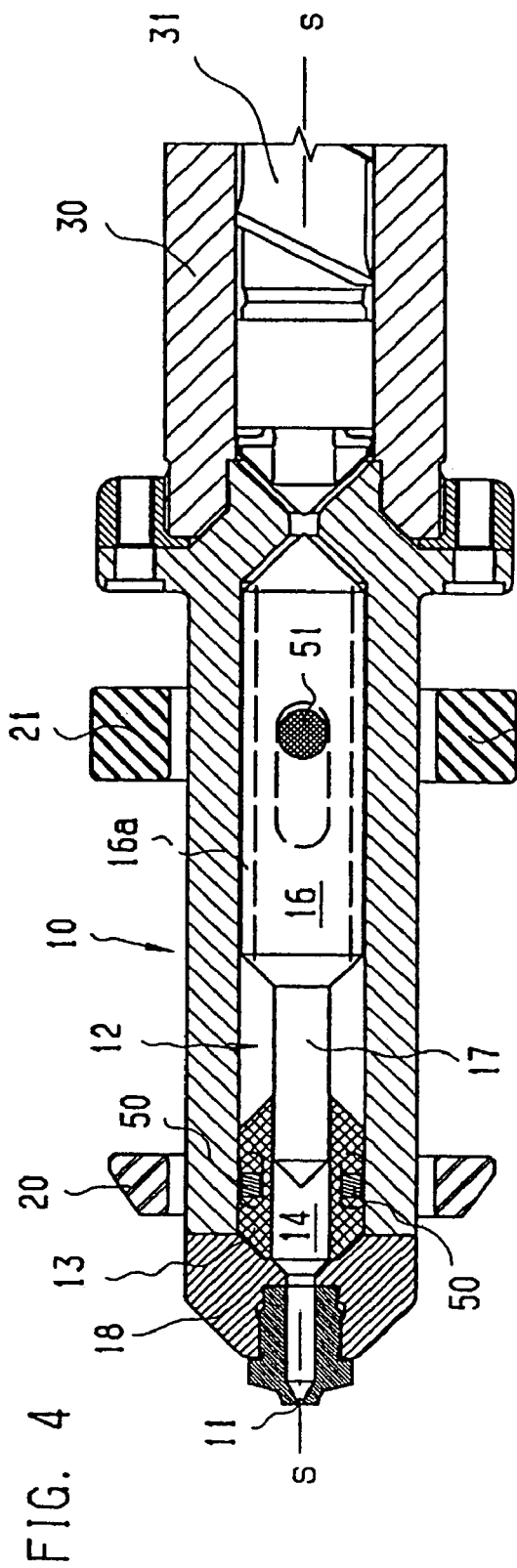
Figure 5:
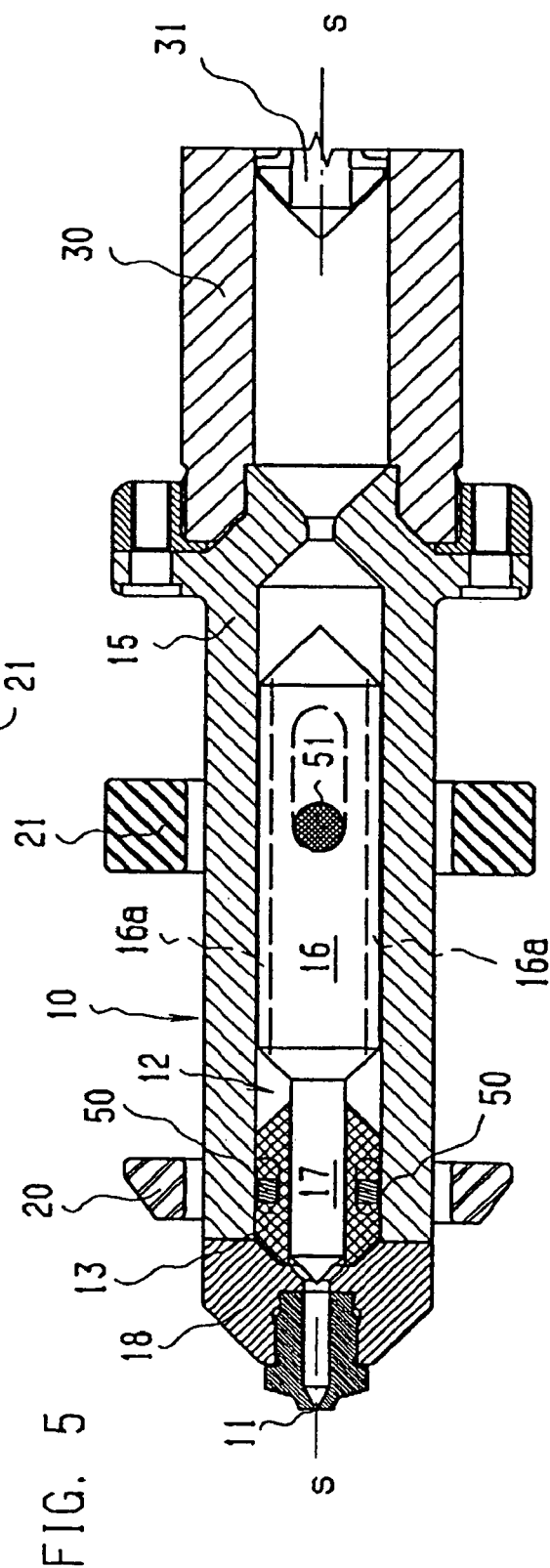

This pressure equalization only changes when the closure element according to FIG. 4 is transferred to the left into the closure position by the actuation element 50 in conjunction with the ring 20 and the associated actuation member 40. The channel between the closure element 13 and the nozzle head 18 which is still present there in FIG. 3 is hence closed.

What is thereby advantageous is the relatively long sealing face relative to a simple closure of the passage channel 13a.

The holding pressure now applies on the one side of the closure element in the direction of the injection mould and, on the other side, the dosing pressure. However, the pressure ratios at the pressure element 16 have also changed since the piston 17 of the pressure element 16 is now subjected to holding pressure. Hence a separation is effected between the holding pressure chamber 14 and the dosing chamber 15 which is present behind the closure element. If new material is now dosed, a uniform pressure is set in front of the pressure element in the region of the nozzle channel 12 and between closure element and pressure element 16, however since the piston 17 is subjected to a different pressure, the forces around the pressure element 16 are no longer cancelled out. Since the holding pressure and hence the actuation of the pressure element 16 with piston 17 is effected from the outside via the actuation element 50 and the ring 20 due to the actual values of an internal pressure sensor preferably in the injection mould, this is however without consequence for the injection molded part since this is not influenced by the pressure ratios around the pressure element.

As a result, the pressure element 16, although it is located in the nozzle channel 12, can move freely as an element which is mounted so as to float. Whilst material is therefore dosed for the next cycle already in the dosing chamber 15, the holding pressure can still be applied from the holding pressure chamber 14 by actuation of the pressure element by means of ring 21 and actuation element 51. The movement of the pressure element leads not to a change in volume but only to a volume displacement so that dosing can take place nevertheless in a uniform manner behind the closure element. Hence, simultaneous dosing and application of holding pressure is therefore possible so that the holding pressure time, the length of which normally definitively determines the cycle e.g. in the case of PET preforms, can be used already for dosing the next cycle. The separation thus offered between dosing and holding pressure is possible in the nozzle body 10 by means of the externally actuated elements.

According to the method, a cyclical separation of a chamber in the nozzle body 10 and influencing of this chamber by means of a further actuation member 41 is effected. The holding pressure chamber 14 and dosing chamber 15 are thereby configured such that the holding pressure chamber 14 can be influenced in a controlled or regulated manner during the holding pressure phase, whilst the dosing of the next cycle can begin at the same time already behind the closure element.

It goes without saying that this description can be subjected to the most varied of modifications, changes and adaptations which act as equivalents with respect to the dependent claims.

The invention claimed is:

1. Nozzle body for an injection molding machine for processing plastic materials and other plastifiable materials, the nozzle body comprising:
   a nozzle opening for injecting the plastified material into an injection mould,
   at least one nozzle channel discharging in the nozzle opening for connection to a plastifying cylinder,
   at least one closure element having an open position and a closed position and is disposed in the nozzle body, wherein the closure element in the closed position is arranged between the injection mould and a holding pressure chamber which is in open communication at least at times with the injection mould,
   an actuation member associated with the nozzle body for influencing the holding pressure chamber by means of a separate pressure element, which is disposed in the nozzle body and is actuatable independently of the nozzle body and the plastifying cylinder,
   wherein the separate pressure element is adapted to be moved in the nozzle channel in a limited fashion without changing the volume of the plastified material available in the nozzle body.

2. Nozzle body according to claim 1, wherein the closure element is arranged in the closed position between the holding pressure chamber and a dosing chamber which is connected to a feeding means of a plastifying cylinder.

3. Nozzle body according to claim 1, wherein the actuation member is in operative connection with the pressure element.

4. Nozzle body according to claim 1, wherein the pressure element is arranged coaxially to an injection axis going through the nozzle opening in the nozzle channel of the nozzle body.

5. Nozzle body according to claim 1, wherein, when the closure element is in the open position, the pressure acting as a result of the plastified material being under pressure upon the outer faces of the pressure element with piston from the direction of the nozzle opening is equal to that pressure upon the outer faces of the pressure element from the rear as a result of the pressure of the plastified material.

6. Nozzle body according to claim 5, wherein the piston acting on the holding pressure chamber is guided in the closure element.

7. Nozzle body according to claim 1, wherein the pressure element comprises through-flow channels for the passage of plastified material, said channels being delimited by a wall of the nozzle channel.

8. Nozzle body according to claim 1, wherein the closure element is disposed in a flow direction of the plastifiable material after the pressure element but parallel to a piston of the pressure element.

9. Nozzle body according to claim 1, wherein the closure element is disposed in the nozzle channel and has passage channels for plastified material in the open position.

10. Nozzle body according to claim 9, wherein the passage channels are closed by an axial movement of the closure element on the wall of the nozzle channel at the end-side on the nozzle head.

11. Nozzle body according to claim 1, wherein, when the closure element is in the open position, the pressure acting as a result of the plastified material being under pressure upon the outer faces of the closure element from the direction of the nozzle opening is equal to that pressure upon the outer faces of the pressure element from the rear as a result of the plastified material.

12. Nozzle body according to claim 1, wherein the closure element moves from the open position to the close position by an actuation element.

13. Nozzle body according to claim 1, wherein the pressure element is in one piece with a piston.

14. Method for closing a nozzle body of an injection molding machine for processing plastic materials and other plastifiable materials, the nozzle body having a holding pressure chamber being separated cyclically in the nozzle body by means of a closure element actuated by an actuation member and, in the closure position of the closure element, the holding pressure chamber being influenced by means of a second actuation member with a pressure element being actuated in the nozzle body independently of the nozzle body and the plastifying cylinder, the method comprising:

moving the separate pressure element in the nozzle channel without a change in volume of the plastified material in the body.

15. Method according to claim 14, wherein the closure of the nozzle channel is effected by means of the closure element before the holding pressure phase and in that the further actuation member controls the holding pressure in the injection mould by influencing the holding pressure chamber.

16. Method according to claim 14, wherein the second actuation member controls either the internal pressure or the volume of the holding pressure chamber or both of them by means of the pressure element.

17. Method according to claim 14, wherein, during influencing of the holding pressure chamber in the closure position of the closure element plastified material is dosed simultaneously in the dosing chamber at least at times.

18. Method according to claim 14, wherein the pressure element and/or the closure element is movable in the nozzle channel when the closure element is open, without a change in volume of the plastified material surrounding the pressure element.

19. Method according to claim 14, wherein the forces around the pressure element are cancelled out.

* * * * *